3,439,062
EPISULFIDE-MODIFIED EPOXIDE POLYMER COMPOSITIONS AND METHOD OF PREPARATION
Stephen Adamek, Islington, Ontario, and Bertie B. J. Wood, Oakville, Ontario, Canada, assignors to The Dunlop Company Limited
No Drawing. Filed June 28, 1966, Ser. No. 561,020
Claims priority, application Great Britain, July 30, 1965, 32,580/65
Int. Cl. C08g 45/06, 30/14
U.S. Cl. 260—830                20 Claims

ABSTRACT OF THE DISCLOSURE

Tough, durable, weather-resistant coatings are prepared from novel polymer compositions comprising a mixture of (A) a polymer of an episulfide having from 2 to 4 carbon atoms, said polymer having a molecular weight less than 10,000 and at least two reactive terminal groups and (B) an epoxide compound selected from epoxide resins and aliphatic, cycloaliphatic and aromatic compounds having at least two epoxide groups, in the proportions of from 5 to 99 parts by weight of (B) and 100 parts by weight of (A) and (B). These compositions are also useful as adhesives, producing bonds of high shear and tensile strength.

---

This invention relates to polymer compositions and particularly to polymer compositions comprising a polymer of one or more episulphides, and to a process for the preparation of reaction products of such a polymer.

According to the present invention, a polymer composition comprises the reaction product of a polymer of one or more episulphides having at least two reactive terminal groups with an organic compound containing at least two epoxide groups.

According to the present invention also, a process for the preparation of a polymer composition comprises mixing a polymer of one or more episulphides having at least two reactive terminal groups with an organic compound containing at least two epoxide groups, and allowing said polymer to react with said organic compound to form the polymer composition.

The reaction between the polymer of one or more episulphides and the organic compound containing at least two epoxide groups can be carried out in the presence of a catalyst to promote the reaction, and when an epoxide resin is used it is preferred to employ a catalyst. The catalysts which may be used are those catalysts which are normally used to effect curing of epoxide resins. Examples of suitable catalysts are organic amino compounds such as tetraethylenepentamine and especially tertiary amino compounds such as dialkllamino phenols, e.g. dimethylamino methyl phenol; and acid anhydrides. The amount of the catalyst can vary over a wide range depending upon the desired rate of reaction, but amounts of from 5 parts to 40 parts by weight and preferably from 10 parts to 25 parts by weight of the catalyst per 100 parts by weight of the epoxide compound are usually used.

The composition can, if desired, be used in the presence of an organic solvent for the polymer and the organic compound containing epoxide groups, and examples of suitable solvents are hydrocarbons such as benzene and toluene, and chlorinated hydrocarbons such as chlorobenzene. Chloroform or carbon tetrachloride may also be used. Whether or not a solvent is used is dependent to some extent upon the use to which the polymer composition is to be put; for instance if the composition is to be used to provide articles with a protective coating of the polymer, then it may be desirable to prepare the composition in the presence of a solvent to produce a composition which can be painted or sprayed on to the surface to be coated. The amount of the solvent used is not critical but amounts of from 50 parts to 300 parts by weight of the solvent per 100 parts of the polymer of one or more episulphides will usually be used. The viscosity of the resulting polymer composition can readily be adjusted by adding solvent to or removing solvent from the composition, as required.

The polymer of one or more episulphides has at least two reactive terminal groups which can be, for instance, amino groups, —SH groups or —OH groups. Suitable polymers can be prepared by polymerizing one or more episulphides using a catalyst being a compound of Group II-B of the Mendeleeff Periodic Table in the presence of a cocatalyst and a suitable polymerization process is described in our copending patent application No. 26,903/64. In this copending patent application there is described a process which comprises polymerizing one or more episulphides in the presence of a polymerization catalyst being a compound of a metal of the B sub-group of Group II of the Mendeleeff Periodic Table and a cocatalyst being ammonia, an inorganic ammonium compound, an organic amine, hydrazine or a derivative of hydrazine. The resulting polymer has a terminal thiol group and another reactive terminal group which will usually be an amino group. The episulphide can be, e.g. ethylene episulphide, propylene episulphide or butylene episulphide.

The polymer of one or more episulphides can have a molecular weight of greater than 10,000 but it is preferred to use a polymer having a molecular weight of less than 10,000, and particularly useful polymers are those having a molecular weight of less than 3,500.

The organic compound containing at least two epoxide groups will usually be thermosetting and can be a monomeric cycloaliphatic compound of lower molecular weight such as vinyl cyclohexene diepoxide, or an aliphatic or aromatic compound in which case the amount of the epoxide reacted with the polymer of one or more episulphides will usually be from 5 parts to 50 parts, and preferably from 10 parts to 35 parts per 100 parts of the polymer composition. Alternatively, the epoxide compound can be a polymer or a resin such as the reaction product of Bisphenol A and epichlorhydrin. The resins which may be used are those which can be heat-set, but which are not heat-set prior to mixing with the polymer. Preferably, the resin is a liquid or a solid of low melting point. When a resin is used, the amount of the resin is usually from 50 parts to 99 parts by weight per 100 parts by weight of the polymer composition, i.e. per 100 parts of the total weight of said organic compound and the polymer of one or more episulphides.

The epoxide groups of the epoxide compound react with the reactive terminal groups of the polymer of one or more episulphides. The initial stage of the reaction is the reaction of one of the epoxide groups of an epoxide compound with each of the reactive groups of the polymer to yield a polymer containing reactive epoxide groups. The reactive epoxide group or groups can then react with a further molecule of the polymer to form a cross-linked product.

By suitable choice of the ratio of the reactants and the reaction temperature, a linear or cross-linked polymer composition can be obtained, or the reaction can be terminated prior to cross-linking to yield a polymer containing epoxide groups. When the organic compound containing at least two epoxide groups is an epoxide resin, it is often desirable to heat the polymer composition to effect final curing of the reaction product and temperatures of from 120° C. to 180° C., preferably from 140° C. to 160° C. may be employed. To obtain a cross-linked product it is preferred, and may in some cases be necessary to employ a catalyst.

The polymer compositions of the present invention obtained using an epoxide resin can be used as coating compositions or as adhesives. Coatings of the polymer compositions can be applied by spreading, painting or spraying, and can be dried to form a hard, glossy protective coating. Alternatively, the polymer compositions can be used as adhesives by applying them between the surfaces to be united and then drying the composition. A firm adhesion of the polymer to the substrate results. The substrate can be a metal such as steel which may be in sheet, cord or wire form, or it can be wood, textiles or paper. When the polymer composition is to be used as an adhesive, it is preferred to prepare the composition in the absence of an organic solvent and to apply the composition by spreading. The polymer compositions obtained using a monomeric epoxide may be liquids of only slightly increased molecular weight.

The invention is illustrated by the following examples, in which all "parts" are parts by weight:

EXAMPLE I

This example illustrates the formation of a reaction product of a monomeric diepoxide and poly(propylene episulphide).

10 grams of poly(propylene episulphide) having one amino and one thiol end group per molecule were dispersed in 50 mls. of water, and 6 grams of vinyl cyclohexene diepoxide were added. The mixture was agitated by tumbling for 24 hours at room temperature, after which time the resulting polymer was removed by filtration and dried.

The end groups of the resulting polymer were determined by infra-red spectroscopy, and it was found that the average number of epoxide groups in the polymer was 0.4, the average number of thiol groups (—SH) was 0.2, and the average number of hydroxy groups (—OH) was 1.2.

The polymer was a liquid which had a slight odour.

EXAMPLE II

The procedure outlined in Example I was repeated twice except that 25 grams of the poly(propylene episulphide) were used and the vinyl cyclohexene diepoxide was replaced by 2.5 grams and 5.0 grams, respectively, of an epoxy resin derived from Bisphenol A and epichlorhydrin available under the trade name Epon 828.

The end groups of each resultant polymer were determined and the results were as follows:

Experiment 1

(—SH)=0.5, (—NH$_2$)=0.5, (epoxide)=1.1

Experiment 2

(—SH)=0.5, (—NH$_2$)=1.4, (epoxide)=1.4

Each polymer was a liquid having a very slight odour.

EXAMPLE III 1.0 part of poly(propylene episulphide) having one amino group and one thiol end group per molecule having a molecular weight of 1040 were mixed with 3.5 parts of a resin derived from Bisphenol A and epichlorhydrin (available under the trade name Epikote 828), and 0.35 part of dimethylamino methyl phenol were added as catalyst. The liquid mixture was stirred and was then spread over the surface of a mild-steel plate to form a film of thickness 0.003 inch. The film was allowed to stand overnight at room temperature whilst exposed to the atmosphere. The film dried in this time to produce a hard, glossy protective coating adhered to the mild-steel panel. The resulting film was heated at 160° C. for 30 minutes. A clear, glossy coating was obtained having the following properties:

| Test: | Result |
| --- | --- |
| Hardness (pencil) | 3H. |
| 5% aqueous sodium hydroxide | Unaffected after immersion for 100 hours. |
| 5% salt solution spray | Unaffected after spraying for 14 days. |
| Impact resistance [1] | Satisfactory. |
| Flexibility [2] | Satisfactory. |

[1] The impact resistance of the coating was considered satisfactory if the coating passed the test described in "Defence Specification DEF/1053, Sept. 26, 1952 as amended Dec. 10, 1955, method 17(a)." The apparatus was used with all four washers to give full indentation.
[2] Flexibility was considered satisfactory if the coating could be bent around a ⅛ inch mandrel without cracking.

The above procedure was repeated using the following ingredients:

| | Parts |
| --- | --- |
| Polymer | 10.0 |
| Epikote 834 | 15.0 |
| Dimethylamino methyl phenol | 1.5 |
| Toluene | 25.0 |

The properties of the resulting coating were as follows:

| Test: | Result |
| --- | --- |
| Hardness (pencil) | 4H. |
| 5% aqueous sodium hydroxide | Unaffected after immersion for 100 hours. |
| 5% salt solution spray | Unaffected after spraying for 14 days. |
| Impact resistance [1] | Satisfactory. |
| Flexibility [2] | Satisfactory. |

[1] The impact resistance of the coating was considered satisfactory if the coating passed the test described in "Defence Specification DEF/1053, Sept. 26, 1952 as amended Dec. 10, 1955, method 17(a)." The apparatus was used with all four washers to give full indentation.
[2] Flexibility was considered satisfactory if the coating could be bent around a ⅛ inch mandrel without cracking.

EXAMPLE IV 1.0 part of poly(propylene episulphide) of molecular weight 1040 as used in Example III, 2.0 parts of Epikote 815 and 0.2 part of dimethylamino methyl phenol were thoroughly mixed together and the mixture was heated at 140° C. for 40 minutes. The product was a hard, flexible resin.

EXAMPLE V

Needled, chopped-strand, glass fibre mat was cut to fill a small mould, and the fibre was impregnated with the following mixture:

| | Parts |
| --- | --- |
| Poly(propylene episulphide)—M.W. 1040 | 10.0 |
| Epikote 828 | 35.0 |
| Dimethylamino methyl phenol | 3.5 |

The poly(propylene episulphide) was that used in Example IV.

The mixture was heated in the mould at 160° C. for 1 hour under a pressure of 840 pounds per square inch. A strong glass-reinforced resin having a tensile strength of 12,700 pounds per square inch was obtained.

EXAMPLE VI

This example illustrates the use of a composition comprising the reaction product of poly(propylene episulphide) having one amino and thiol end group per molecule, and an epoxide resin as an adhesive.

Two polymer compositions (A and B) were prepared according to the following formulae:

|  | Parts | |
|---|---|---|
|  | Composition A | Composition B |
| Polymer (molecular wt. 1810) | 1.0 | 1.0 |
| Epikote 828 | 3.5 | 2.5 |
| Dimethylamino methyl phenol | 0.35 | 0.25 |

Each composition was applied immediately after mixing between two testpieces, made of aluminum. The testpieces were 1 inch wide strips and they were adjoined together with a 1 inch overlap. The laminates were heated at 160° C. for 45 minutes after which time they were cooled to room temperature. The shear strength of the adhesive bond was determined by pulling the testpieces apart using an Instron tester. The results are shown in Table I below. The test was repeated using steel testpieces instead of the aluminum testpieces.

The tensile strength of the adhesive bond obtained using composition A was also determined using two cylindrical metal testpieces of diameter ¾ inch which were joined end-to-end by means of the polymer composition. The results are shown in Table I below.

For purposes of comparison, a further composition (composition C) was prepared from 10 parts of Epikote 828 and 1 part of dimethylamino methyl phenol. The results are shown in Table I, in which strength is given in pounds per square inch.

TABLE I

|  | Shear strength | | Tensile strength | |
|---|---|---|---|---|
|  | Aluminum | Steel | Aluminum | Steel |
| Composition A | 2,261 | 3,740 | 6,610 | 8,420 |
|  | 2,678 | 3,678 | 8,040 | 8,420 |
| Composition A |  | 4,100 | 8,600 | 7,260 |
|  |  |  |  | 10,300 |
| Composition B | 2,330 | 2,935 |  |  |
|  | 2,395 | 3,070 |  |  |
|  |  | 3,720 |  |  |
| Composition C | 2,018 | 2,400 |  |  |
|  | 1,905 | 3,670 |  |  |

EXAMPLE VII

The following coating composition was prepared:

| | Parts |
|---|---|
| Diamino-tipped poly(propylene episulphide) | 5 |
| Epikote 828 | 10 |
| 2,4,6-tri(dimethylamino methyl) phenol | 1.0 |
| Cellulose acetate butyrate | 1.5 |
| Toluene | 14.8 |

The diamino-tipped poly(propylene episulphide) used in this and other examples was prepared by the following method.

Poly(propylene episulphide) having an amine and a thiol end group to each molecule was treated at room temperature with successive small additions (about 10 ml.) of ethylene imine, whilst stirring vigorously. Periodically, a sample was extracted and treated with sodium nitroprusside. This was continued until no purple coloration was obtained in the nitroprusside test indicating that thiol groups were no longer present in the polymer. Examination of the polymer by infra-red spectroscopy indicated that substantially all the end groups were of the amino type.

The cellulose acetate butyrate was used as a 10 percent solution in methylethyl ketone.

This composition was sprayed on to mild steel and aluminum panels. After air-drying overnight the panels were stoved for 30 minutes at 160° C. and tested with the following result:

| | |
|---|---|
| Pencil hardness | 3H. |
| Flexibility | Pass ⅛ inch. |
| 5% caustic soda resistance | Unaffected after 5 days. |
| Salt spray exposure (14 days) | Slight creep in isolated spots, general condition excellent. |
| Impact | Pass ¾ indentation. |

A second series of panels coated with the same composition was tested after air-drying only for 3 days (i.e. not stoved). The properties of the coating were similar to those of the stoved system except for a slight reduction in flexibility and impact resistance.

EXAMPLE VIII

A composition was made up as in Example VII, except that the level of diamino-tipped poly(propylene episulphide) was increased to 10.0 parts and the toluene increased 19.4 parts to maintain a solids content of 50 percent. Coatings on mild steel and aluminum panels were tested after air-drying, followed by stoving at 160° C. for 30 minutes.

| | |
|---|---|
| Pencil hardness | 3H. |
| Flexibility | Pass ⅛ inch. |
| 5% caustic soda resistance | Unaffected after 5 days. |
| Salt spray exposure (14 days) | No rust creep. General condition excellent. |
| Impact | Pass full indentation. |

EXAMPLE IX

Three adhesive compositions were made up as follows:

| | A | B | C |
|---|---|---|---|
| Diamino-tipped poly(propylene episulphide) | 1.0 | 1.0 | 1.0 |
| Epikote 828 | 1.5 | 2.5 | 3.5 |
| Dimethylamino methyl phenol | 0.15 | 0.25 | 0.35 |

Each of these were used to coat the plane surfaces of cylindrical steel or aluminum testpieces which were then pressed together and cured for 45 minutes at 160° C. The tensile strength of the adhesive joint was then measured by pulling the testpieces apart using an Avery Tensile Tester.

|  | Steel/steel (tons/sq. in.) | Aluminum/aluminum (tons/sq. in.) |
|---|---|---|
| Adhesive A | 3.88 | 2.1 |
|  | 4.81 | 2.5 |
|  | 4.44 | 2.2 |
| Average | 4.38 | 2.27 |
| Adhesive B | 5.34 | 2.9 |
|  | 4.88 | 2.8 |
|  | 4.25 | 3.7 |
| Average | 4.82 | 3.13 |
| Adhesive C | 5.25 | 3.1 |
|  | 4.52 | 3.8 |
|  | 4.23 |  |
| Average | 4.67 | 3.45 |

EXAMPLE X

Glass reinforced laminates were prepared using woven glass-cloth having the following specification:

| | |
|---|---|
| Weave—4 end satin | 225/3/2 warp |
| 48 ends per inch | 450/1/2 weft |
| 30 picks per inch | 8½ oz. per sq. yd. |

Two resin blends were prepared as follows:

| | 1 | 2 |
|---|---|---|
| Epikote 828 | 35.0 | 35.0 |
| Dimethylamino methyl phenol | 3.5 | 3.5 |
| Diamino-tipped poly(propylene episulphide) | | 10.0 |

A small amount of toluene was added to each to give a suitable application viscosity.

Each resin blend was brushed on to pre-cut 7 inches x 7 inches squares of the glass-cloth to give a weight ratio of 30 parts resin to 70 parts cloth. The squares were then dried and partially cured by heating for 10 minutes at 100° C. Seven of the pre-impregnated sheets were then laid up in a mould and pressed at 500 p.s.i. and 180° C. for 30 minutes. Testpieces were then cut from the sheets for determination of tensile strength, Young's modulus and impact resistance.

| | Tensile strength (p.s.i.) | Young's modulus (p.s.i.) | Impact strength |
|---|---|---|---|
| Resin blend 1 | 87,000 | $3.62 \times 10^6$ | Cracks at 2 ft. lb. breaks in half at 4 ft. lb. |
| Resin blend 2 | 70,500 | $3.97 \times 10^6$ | Indents at 2 ft. lb. Punctures at third blow at 3 ft. lb. No cracking. |

EXAMPLE XI

A coating composition was prepared from the following ingredients:

| | Parts |
|---|---|
| Epikote 828 | 3 |
| Dihydroxyl-tipped poly(propylene episulphide) | 2 |
| Dimethylamino methyl phenol | 0.3 |

The dihydroxyl-tipped poly(propylene episulphide) was prepared by bubbling slowly ethylene oxide through a stirred sample of an amino-tipped poly(propylene episulphide) at room temperature. Periodically, a sample was extracted and tested with sodium nitroprusside for the presence of thiol groups. After about 6 hours treatment with ethylene oxide the nitroprusside test indicated that thiol groups were no longer present. Examination of the so treated polymer by infra-red spectroscopy indicated that the polymer had only hydroxyl end groups and virtually no amino or thiol groups.

This coating composition was sprayed on to mild steel and aluminium panels and stoved for 30 minutes at 160° C. after air-drying. The following test results were obtained:

| | |
|---|---|
| Pencil hardness | 2H. |
| Flexibility | Pass ⅛. |
| 5% caustic soda resistance | Film cloudy after 90 hours but still hard and adherent. |
| Salt spray exposure (14 days) | No rust creep. |
| Impact | Pass full indentation. |

EXAMPLE XII

This example covers the use of these compositions in pigmented systems.

A two-part white paint was prepared from the following ingredients:

Part A

| | Parts |
|---|---|
| Amino-thiol-tipped poly(propylene episulphide) | 5.0 |
| Rutile titanium dioxide | 5.0 |
| 2,4,6-tri(dimethyl amino methyl) phenol | 1.0 |
| Cellulose acetate butyrate | 1.5 |
| Toluene | 4.0 |

Part B

| | |
|---|---|
| Epikote 828 | 10 |
| Rutile titanium dioxide | 10 |
| Toluene | 10 |

The cellulose acetate butyrate was used as a 10 percent solution in methylethyl ketone.

Each part was passed three times through a triple-roll mill and mixed together immediately prior to application to mild steel and aluminum panels. The panels were air-dried and some were then stoved at 160° C. for 30 minutes. Hard, glossy coatings were obtained with good resistance to salt-spray exposure and immersion in caustic soda. The stoved paint had somewhat better flexibility and impact resistance but was slightly discoloured.

Having now described our invention, what we claim is:

1. A polymer composition which comprises a mixture of a polymer of an episulfide having from 2 to 4 carbon atoms, said polymer having at least two reactive terminal groups selected from the group consisting of amino, thiol and hydroxy, and a molecular weight of less than 10,000, and an epoxide compound selected from epoxide resins and aliphatic, cycloaliphatic and aromatic compounds having at least two epoxide groups, said epoxide compound being present in the proportions of from 5 to 99 parts by weight per hundred parts of the total weight of the episulfide polymer and the epoxide compound.

2. A polymer composition according to claim 1 in which said polymer has a molecular weight less than 3,500.

3. A polymer composition according to claim 1 in which said organic compound containing at least two epoxide groups is thermosetting.

4. A polymer composition according to claim 1 in which said organic compound containing at least two epoxide groups is a monomeric cycloaliphatic compound of low molecular weight.

5. A polymer composition according to claim 4 in which the amount of the epoxide compound is from 5 to 50 parts per 100 parts of the total weight of said epoxide compound and said episulfide polymer.

6. A polymer composition according to claim 1 in which said organic compound containing at least two epoxide groups is a thermosetting resin.

7. A polymer composition according to claim 6 in which said thermosetting resin is a reaction product of Bisphenol A and epichlorhydrin.

8. A polymer composition according to claim 6 in which the amount of the resin is from 50 to 99 parts by weight per 100 parts of the total weight of the resin and the polymer of at least one episulfide.

9. A process which comprises mixing a polymer of at least one episulfide having from 2 to 4 carbon atoms, said polymer having at least two reactive terminal groups selected from the group consisting of amino, thiol and hydroxy and a molecular weight of less than 10,000, with a polyepoxide containing at least two epoxide groups, and reacting said polymer with said polyepoxide, said polyepoxide compound being present in the proportions of from 5 to 99 parts by weight per hundred parts of the total weight of the episulfide polymer and the polyepoxide compound.

10. A process according to claim 9 in which said reaction is carried out in the presence of a catalyst to promote reaction.

11. A process according to claim 10 in which said catalyst is an organic amino compound.

12. A process according to claim 10 in which said catalyst is an acid anhydride.

13. A process according to claim 10 in which the amount of the catalyst is from 5 to 40 parts by weight per 100 parts by weight of the epoxide compound.

14. A process according to claim 9 in which said polymer of at least one episulfide has a molecular weight of less than 10,000.

15. A process according to claim 9 in which said organic compound containing at least two epoxide groups is a monomeric cycloaliphatic compound.

16. A process according to claim 9 in which the amount of said organic compound is from 5 to 50 parts per 100 parts of the total weight of the organic compound and of the polymer of at least one episulfide.

17. A process according to claim 9 in which the organic compound containing at least two epoxide groups is a resin.

18. A process according to claim 17 in which the resin is a reaction product of Bisphenol A and epichlorhydrin.

19. A process according to claim 17 in which the amount of the resin is from 50 to 99 parts by weight per 100 parts of the total weight of the organic compound and of the polymer of at least one episulfide.

20. A process according to claim 9 in which the mixture of the polymer of at least one episulfide and the organic compound containing at least two epoxide groups is heated to a temperature of from 120° C. to 180° C. to effect production of the reaction product.

References Cited

UNITED STATES PATENTS

| | | | |
|---|---|---|---|
| 3,164,643 | 1/1965 | Hubbard | 260—830 |
| 3,222,326 | 12/1965 | Nicolas | 260—79 |
| 3,258,495 | 6/1966 | Le Fave | 260—830 |
| 3,322,851 | 5/1967 | Berenbaum | 260—79 |
| 3,331,816 | 7/1967 | Bertozzi | 260—79 |
| 3,335,201 | 8/1967 | Bertozzi | 260—79 |
| 3,350,406 | 10/1967 | Meyer | 260—830 |

SAMUEL H. BLECH, *Primary Examiner.*

P. LIEBERMAN, *Assistant Examiner.*

U.S. Cl. X.R.

260—79, 33.6, 33.8, 47, 13; 117—132; 161—185, 186